(12) United States Patent
Zehavi

(10) Patent No.: US 8,711,218 B2
(45) Date of Patent: Apr. 29, 2014

(54) CONTINUOUS GEOSPATIAL TRACKING SYSTEM AND METHOD

(75) Inventor: Ron Zehavi, Maccabim Reut (IL)

(73) Assignee: Verint Systems, Ltd., Herzelia Pituach (IL)

( * ) Notice: Subject to any disclaimer, the term of this patent is extended or adjusted under 35 U.S.C. 154(b) by 720 days.

(21) Appl. No.: 12/367,775

(22) Filed: Feb. 9, 2009

(65) Prior Publication Data

US 2010/0201787 A1    Aug. 12, 2010

(51) Int. Cl.
*H04N 7/18* (2006.01)
*H04W 4/00* (2009.01)

(52) U.S. Cl.
USPC .......................... 348/143; 348/159; 370/328

(58) Field of Classification Search
USPC ................................... 348/143, 159
See application file for complete search history.

(56) References Cited

U.S. PATENT DOCUMENTS

| | | | | |
|---|---|---|---|---|
| 2003/0114983 | A1* | 6/2003 | Irvin et al. | 701/214 |
| 2004/0119819 | A1* | 6/2004 | Aggarwal et al. | 348/143 |
| 2006/0238617 | A1* | 10/2006 | Tamir | 348/143 |
| 2010/0002077 | A1* | 1/2010 | Viggiano et al. | 348/115 |

* cited by examiner

*Primary Examiner* — Ranodhi Serrao
(74) *Attorney, Agent, or Firm* — Meunier Carlin & Curfman

(57) ABSTRACT

A surveillance system and methods are disclosed. The system of the invention includes computing means connected to memory means, input means and a plurality of sensors, such as video camera and plurality of display screens. The system is adapted to compute for the sensors a 3D coverage space which considers terrain data and man-made objects and specific features of the sensors such as the 3D location and the pan, tilt and zoom (PTZ) of the camera and to establish a data base indicative of the coverage area. The system and method of the invention are also adapted to support tracking of an object within the coverage space of the sensors, either in automatic or manual mode and to provide a user of the system with data indicative of sensors into the coverage space of which a tracked object is about to enter.

41 Claims, 6 Drawing Sheets

CONTINUOUS GEOSPATIAL TRACKING SYSTEM AND METHOD

BACKGROUND OF THE INVENTION

Systems for managing or assisting in watching, tracking and administering big crowd/traffic, and specifically for providing security handling of that crowd/traffic, face several problems. One such problem is how to wisely and effectively provide the most relevant portion of security related data accumulated with the system to the operator of the security system. Relevance of security related data may be determined by at least one of several methods and according to one or more sets of parameters.

Data indicative of presence and/or movement of hostile object in the area of interest of a security system may be received, accumulated, recorded and analyzed by the security system. Such data may be received from one or more sensors, such as cameras, video cameras, infra-red (IR) sensor, Tera Hz wave sensor, electromagnetic (EM) RADAR, sonar, milimetric wave/microwave based sensor, magnetic resonance imaging (MRI) sensor, etc.

SUMMARY OF THE INVENTION

A surveillance system for monitoring an area of interest, is disclosed, comprising computing unit, memory means connected to the computing unit, input means connected to said computing unit to receive user instructions, and displaying means connected to said computing unit and to a plurality of sensors to display data received from at least one of said sensors and system data. The displaying means comprising a central display, and at least one encircling display, wherein the displays are capable of displaying at least text and video, wherein said plurality of sensors are in active communication with the computing unit, the coverage area of at least one sensor within said area of interest is mapped in a process of mapping, and saved available to said computing unit. The coverage area is the area that said sensor is able to sense and said computing unit to compute, for at least one of said sensors. Also are computed the 3D coordinates of a location of a sensed item within said coverage area, based on data indicative of the location of said sensed item from said at least one sensor.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
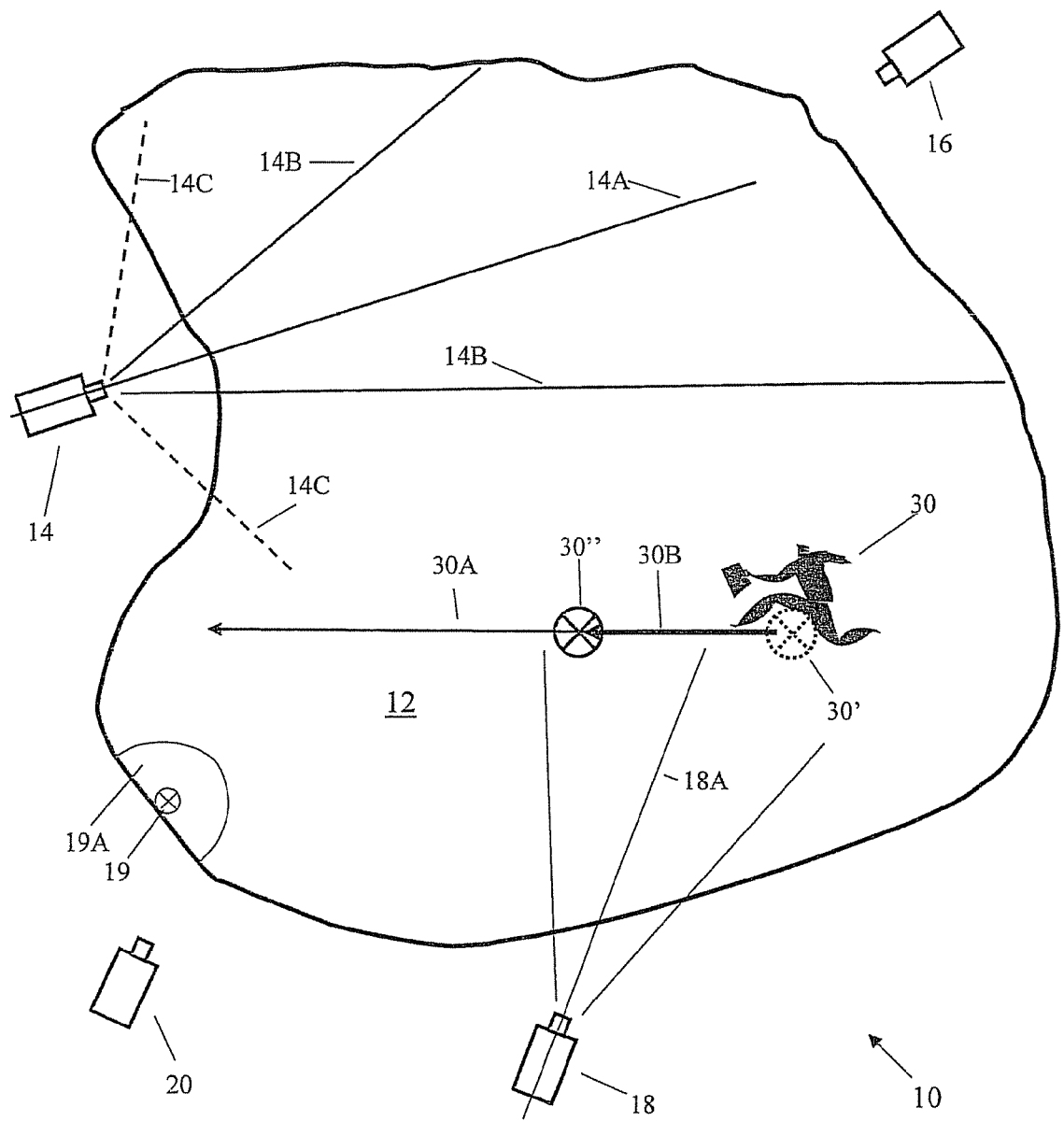
FIG. 1 is a schematic top view illustration of sensors of a surveillance system and their coverage areas according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Security management system may comprise a plurality of sensors of one or more types, for providing several kinds of inputs, mainly indicative of events related to the safety and security of people, equipment, infrastructure and areas covered by that system. The security management system may further comprise a geographical database, preferably a 3D database, covering substantially the area being monitored by the system. The security management system may further store 3D geographical data indicative of the location, orientation and other indicative details of its sensors. The security management system may also be adapted to use the sensors' 3D geographical data in order to correlate the information received from the sensors to real world 3D location within the area of interest. For example, a 2D image taken by a video camera may be accorded the height data ("terrain elevation") relevant to the area covered in the frame by the video camera, based on the knowledge of the camera's 3D location, and direction of view and possibly also length of the focus and amount of used zoom. Accordingly, the security management system may further calculate and display the 2D image as received from the camera modified to present a 3D image of the same field of view. Based on similar capability the security management system may also calculate and display deadzones in the filed of view (e.g. zones within a field of view which are invisible to a sensor due to concealment or masking created by objects positioned between the sensor and the concealed area or object).

Reference is made now to FIG. 1, which is a schematic top view illustration of a surveillance system 10 adapted to monitor area of interest 12 and their respective coverage areas according to embodiments of the present invention. Surveillance, system 10 may comprise several sensors 14, 16, 18 and 20, such as video camera, IR camera, EM Radar, sonar, very shortwave (milimetric/microwave) sensor, MRI sensor and the like. Surveillance system 10 may further comprise a computing unit said computing unit being in active communication with sensors 14, 16, 18 and 20, memory means and communication means to other systems, for example via a network, such as the Internet (not shown), adapted to receive signals from the sensors, to process these signals and to provide control signals to any one of sensors 14, 16, 18 and 20 which is controllable. Surveillance system 10 may further comprise displaying means, such as one or more displays (not shown), input means (not shown) adapted to enable entering data and commands to surveillance system 10. Sensors 14, 16, 18 and 20 may have, each, a certain area within area of interest 12 which is actually sensed by the sensor. Certain sensors may produce 1D information of a location of a sensed object, such as intrusion detectors. Other types of sensors may provide 2D location information of an object, such as a video camera. Yet, in combination with 3D geographical information available to system 10 both covering the terrain included in the image taken by the camera and the location and angle of shooting of the camera itself, a video camera sensor may provide a 3D information of an object in its field of view (3D video camera surveillance). More details of methods and systems for providing 3D location information based on a 2D image taken by, for example, a camera, are disclosed in U.S. patent application Ser. No. 11/158,347 to the applicant of the present invention, which is incorporated here by reference in its entirety. Sensors which may provide 3D location information of an object in their field-of-sensing are, for example, EM Radars.

Some of sensors 16, 19, 20 may be fixedly installed so that their coverage area is fixed. For example, sensor 19 may be an IR volume sensor with a fixed range of sensing 19A. Other types of sensors may be able to move in one or more axes. One such sensor may be video camera 14 able to move around two orthogonal axes on a gimbal joint, for example pan (i.e. turn) horizontally and tilt in a vertical angle and additionally to change its zoom (called also PTZ camera). Such sensor may have an overall coverage range limited between dashed lines 14C-14C due to mechanical limitations, obstacles limitations and the like, with a momentary coverage section limited between lines 14B-14B and having a center line (line of view) 14A. Sensors such as video camera may also have a radius limitation to their coverage area due to, for example, resolution limitation, illumination limitation and the like (not shown).

Based on 3D data stored in memory means of system 10 representing height of locations within area of interest 12 and further based on data representing the X-Y coordinates and the height of a location pointed at, which is included in a 2D image taken within the area of interest 12 by, for example, one of sensors 14, 16, 18 and 20, system 10 may accept an indication, for example by using a pointing device such as a mouse, a pad, a track ball and the like, of a location in a 2D image displayed, for example on a screen connected to system 10, by a user of system 10, and translate this indication to a real location in area of interest 12, for example by computing the X-Y-Z coordinates of the location pointed at on the screen by a user. Further, based on mapping of the coverage area of sensors of system 10, and additionally based as on other features of sensors in system 10, such as type of sensing (TV, IR, night vision, etc.), type of viewing coverage (e.g. 1D, 2D, 3D, PTZ camera, etc.) system 10 may designate one or more sensors to monitor and/or track a specific location in area of interest 12 simply be pointing at the respective location of that point on a display. Mapping of the coverage areas of sensors of system 10 is presented in more details herein below. According to some embodiments of the present invention a user of system 10 may activate system 10 to designate one or more sensors to a specific location within area of interest 12 by entering to the corresponding mode of operation of system 10, and further, by selecting the sensor or sensors to be designated to the desired location in area of interest 12.

Figure 1A:
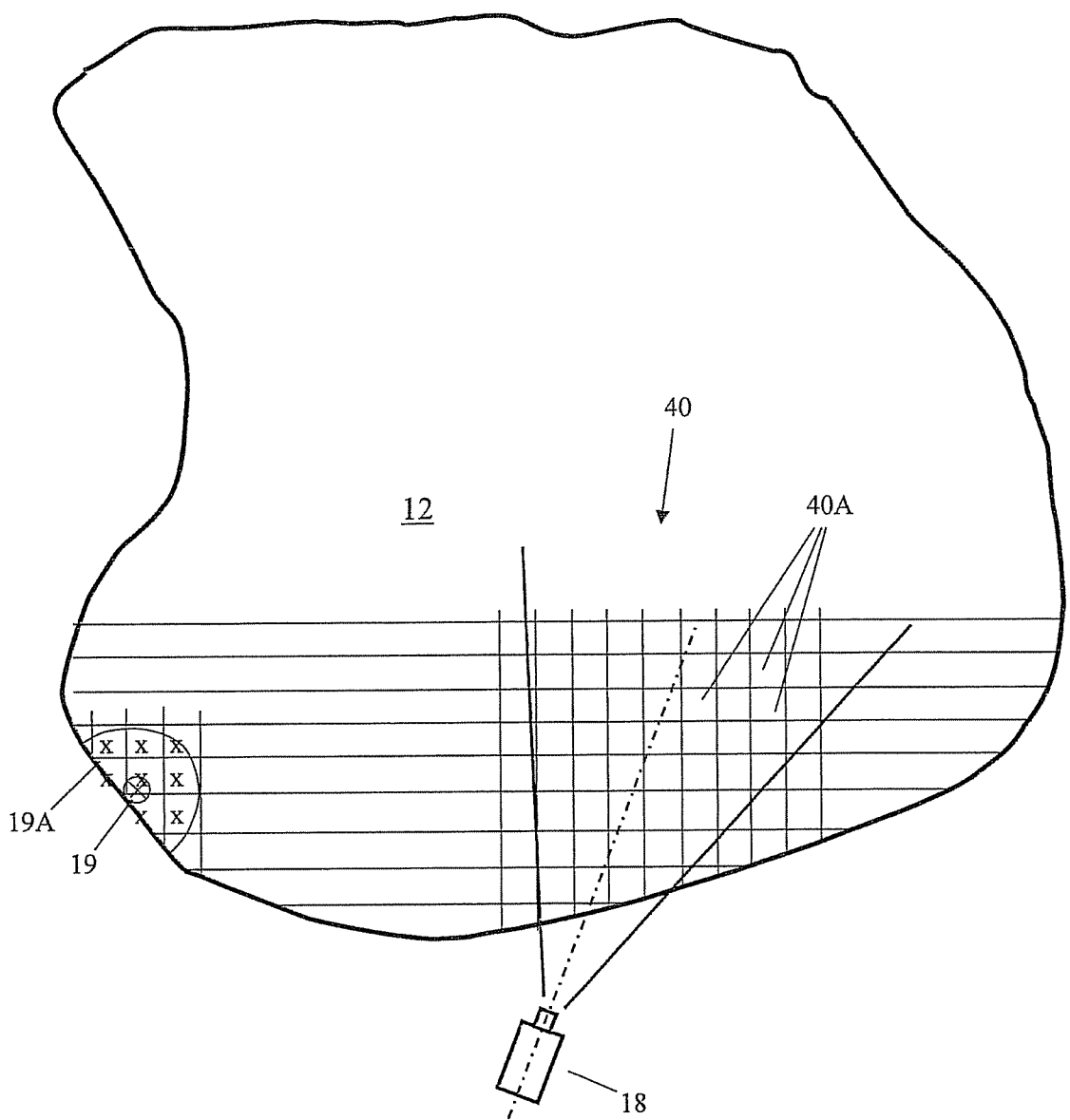
FIG. 1A is a schematic illustration of a method of mapping the coverage area of sensors in a surveillance system according to embodiments of the present invention

Reference is made now also to FIG. 1A, which is a schematic illustration of a method of mapping the spatial coverage of sensors in surveillance system 10 according to embodiments of the present invention. Area of interest 12, or any other area covered and possibly monitored by surveillance system 10 may be partitioned by, for example, a horizontal X/Y grid 40 having a plurality of squares 40A with a required X/Y resolution. The space above horizontal grid 40 may further be partitioned according a required vertical partitioning (not shown in the figure), thus defining a plurality of 3D spatial basic elements in the space defined above the area of interest. For example, according to one embodiment of the invention, the vertical partitioning may be done along a vertical axis Z and may be selected to be same as the X and Y partitioning, thus defining a 3D spatial cubic elements arranged above horizontal grid 40. According to other embodiment of the invention the partitioning along each of the reference frame X, Y, Z may be different from the other two. According to some embodiments of the invention the plurality of 3D basic elements may be defined from the terrain level and up along Z axis only to a defined height. This height limitation may be defined so as to safely cover any type of expected monitored event, for example limited to the height of a truck, assuming that a truck may be the highest body expected to be monitored in the area of interest.

For a sensor in surveillance system 10 a pre-mapping of its sensing spatial coverage may be performed, for example during setup of system 10, after the adding, re-installing, modifying, etc. of the sensor in system 10. The mapping may comprise automatic algorithmic analysis of the actual coverage space of the pre-mapped sensor, and indication of the 3D grid spatial basic elements comprised in the coverage space. The process of pre-mapping may take into considerations terrain elements which may interfere with the Line of Sight (LOS) of the pre-mapped sensor, man-made entities, such as buildings, that may interfere with the LOS of the pre-mapped sensor, etc. The process of pre-mapping may further consider specific characteristics of the pre-mapped sensor, such as whether it is a PTZ sensor, its angle of sight, whether it has and what are its zooming capabilities, etc. For example, for sensor 19 with a coverage planar area 19A within area of interest 12 the grid squares marked with "X" may be indicated as representing the coverage area of sensor 19. Accordingly, 3D basic spatial elements above the squares marked "X" may be mapped as being in the coverage space of sensor 19. In a similar manner the coverage space of each of the sensors occupied in surveillance system 10 may be mapped. For moveable sensors, such as sensor 14, the mapping process may be carried out for the whole span of coverage area, that is to the whole area that the PTZ sensor may sense (or cover), or for portions thereof and may comprise also indication of the momentary coverage space as a function of the momentary value of its PTZ parameters. Typically, the mapping of coverage space may be done off-line beforehand via automatic algorithmic analysis that is performed prior to the operating of surveillance system in an operational mode. However, such computations may be performed on-line, during operation of the surveillance system, with a bearable amount of latency, or none. Based on this mapping it is further possible to provide surveillance system 10 with information indicative, for a certain location in area of interest 12, of its sensors' coverage, that is—which sensor may, or actually covers a certain spatial location. Additionally, for any location in the space defined above area 12 surveillance system 10 may be provided with information indicative of how close a point of interest within the coverage space of a certain sensor to the border of coverage of that sensor. The above process may result in a series of 3D coordinates for a given sensor in system 10, which uniquely define the coverage space of that sensor. This data may be referred to as the sensors 3D spatial coverage database and it may be organized and maintained in any desirable format, such as a look-up table (LUT). It would be apparent for a person skilled in the art that for a given 3D basic spatial element there may be more than one sensor having that element in its coverage space. Accordingly, there may be 3D spatial basic elements in the space above area of interest 12, which are not included in the spatial coverage of any sensor of system 10. Further, other aspects of the performance of a sensor, such as vision performance (day/night, color, etc.), optical resolution, etc. may be recorded and stored in the system.

When system 10 is used in a surveillance mode, the height of a tracked body may be entered to the system by a user of system 10 or may be received as an input from a sensor in the system. Based on the height of the tracked body, system 10 may calculate coverage space for a given sensor as applied to the tracked object and may further limit the use of the data stored in the sensors spatial coverage database to span from terrain level and up to a limitation along axis Z which may be associated with the defined height of the tracked object.

According to embodiments of the invention an automatic preference table may be prepared and maintained to indicate, for any location inside area of interest 12, priority of sensors amongst all sensors covering that location. The priority may be set, for example, based on the quality of the information received through the sensors, on the accuracy of the information, on the readiness for the operator, on the nature of the signal provided by the sensor, e.g. visual TV image, IR TV image, night vision image, etc., and the like. According to embodiments of the present invention there may be pre-prepared more than one table, for example a table for normal events, a table for emergency events, a table for events requiring high speed reaction and the like. Additionally, when operating system 10 in a surveillance mode a user of system 10 may be able to change the priority of sensors' employment by system 10.

It would be apparent to one skilled in the art that based on the sensors spatial coverage database system 10 may allow a user to point at any location on a screen presenting sensed data, such as image data, taken from a sensor in system 10, and associate one or more sensors to this location so that this location is in the coverage space of those sensors. Thus, system 10 forms a control environment in which the user may define the location of interest in area of interest 12 (FIG. 1) and get in response identification of sensors having this location inside their coverage space.

Figure 2:
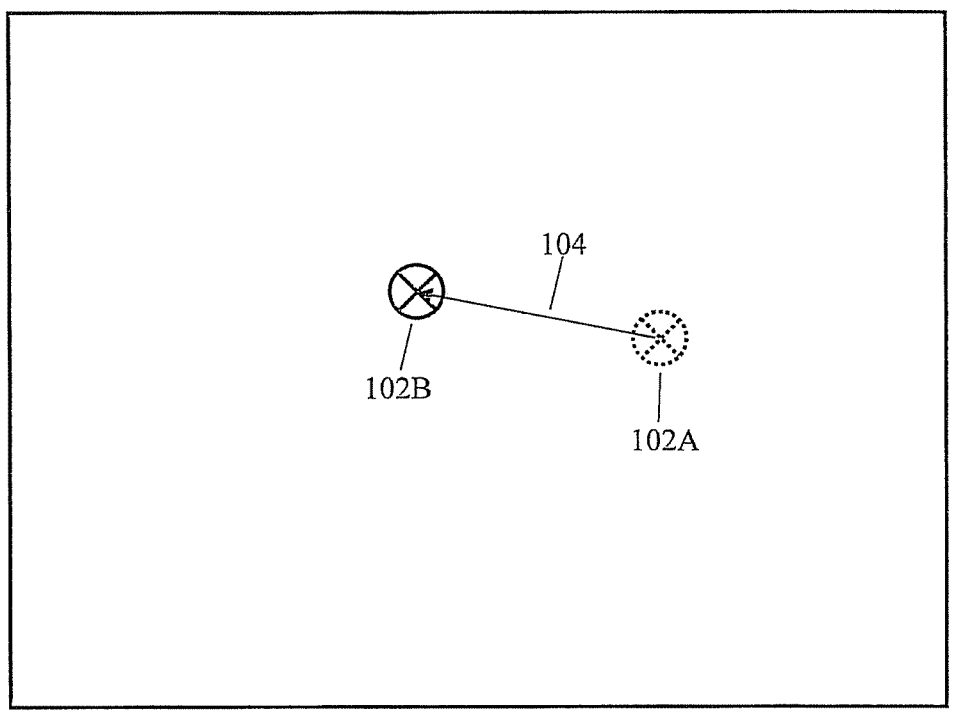
FIG. 2 is a schematic illustration of an imaged moving object, according to embodiments of the present invention.

An object of interest 30 (FIG. 1) may be in the area of interest 12. Object 30 may be static or dynamic, location wise. An initial location of object 30, at a certain first time, may be indicated by dashed-line cross-hair symbol 30'. When object 30 moves it may have a momentary vector of movement 30B having a momentary value representing the origin point of object 30, the direction of movement of object 30 and the object's velocity. Due to that movement a secondary location of object 30, at a certain second time, on the vector of movement 30A may be indicated by full-line cross-hair symbol 30". The representation of the movement of object 30 on an image taken by, for example, a video camera sensor 18, or by a similar 2D sensor, is depicted by FIG. 2, which is a schematic illustration of an imaged moving object 102, according to embodiments of the present invention. The imaged movement of object 30 (FIG. 1) is represented by two points in image 100. Point 102A corresponds to location 30' of object 30 and point 102B corresponds to location 30" of object 30. Accordingly, vector 104 is the representation of momentary movement vector 30B. Momentary movement vector 104 may be calculated and presented as a movement vector indication integrated into the image of 'real world' as is captured by, for example, camera 18 (as in FIG. 2) relying on the camera's location and direction of shooting and the 3D database of the terrain on which object 30 is moving, and the integrated image may be presented on a screen. Thus, based on a 2D image of a moving object and based on the 3D location and direction of sensing of the sensor, for example a video camera, calculation may be done to project an indication of the sensed movement onto the real world within the field of view of the imaging device.

Figure 3:
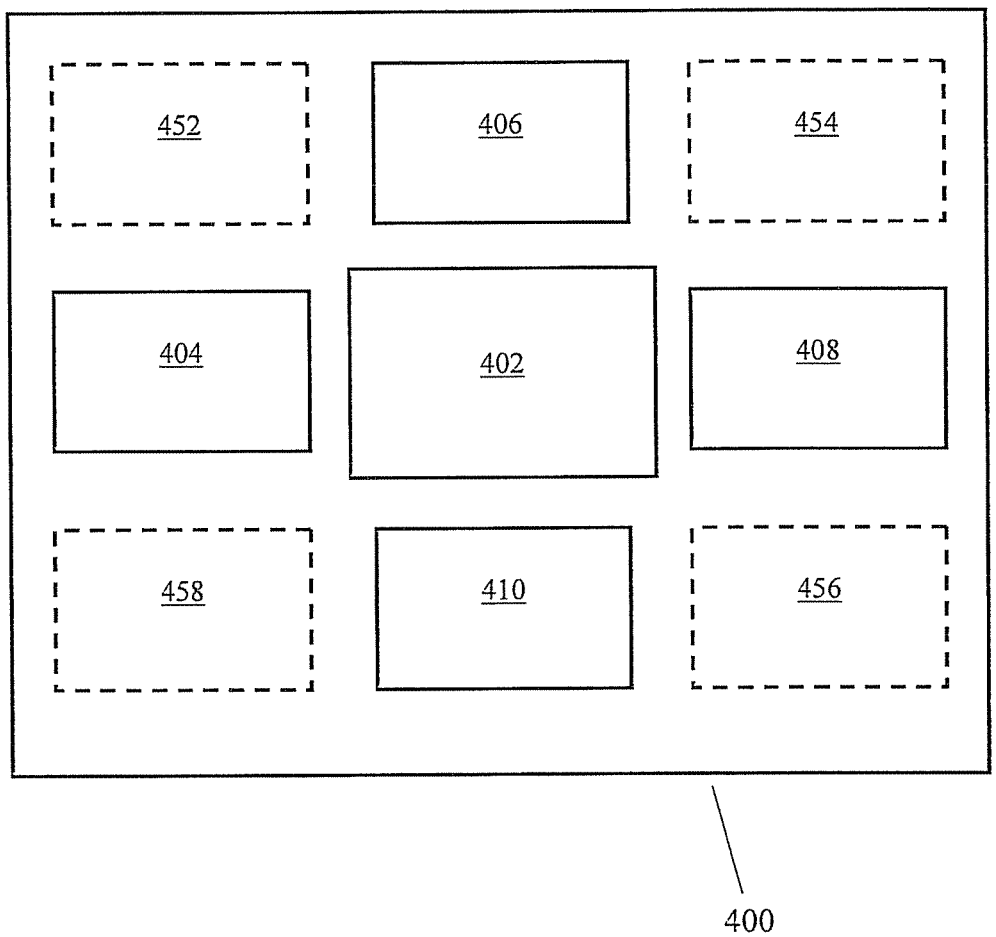
FIG. 3 is a schematic illustration of a control panel of a surveillance system according to embodiments of the present invention.

Reference is made now to FIG. 3 which is a schematic illustration of control panel 400 of surveillance system 10 according to embodiments of the present invention. Control panel 400 may be part of the operational equipment of a control center of surveillance system 10. Control panel 400 may comprise, for purposes of display of information at least a central display 402 and one or more encircling displays 404, 406, 408 and 410. Display 402 may be any kind of display capable of displaying video, still photos, graphics, text and the like and any combination thereof. Encircling displays 404, 406, 408 and 410 may be of any kind capable of displaying at least text and video and optionally also still photos and graphics. According to some embodiments central display 402 may be of larger size compared with encircling displays 404, 406, 408 and 410 an may optionally have also better resolution, better refresh rate, etc. In some embodiments control panel 400 may further comprise encircling corners displays 452, 454, 456 and 458. In one mode of operation central display 402 may be used to display an object of interest or an area where an event of interest takes place. In some embodiments encircling displays 404, 406, 408 and 410 may be used to display areas corresponding and neighboring the area being displayed in central display 402. Further, when an object of interest which is displayed on central display 402 is moving, surveillance system 10 may send for display on each one of encircling displays 404, 406, 408 and 410 visual input, such as video input presenting an area neighboring to the area being displayed in central display 402. Further, the visual input sent for display on each one of encircling displays 404, 406, 408 and 410 may be arranged so that the area being displayed on a specific side display presents is an area the moving object of interest is most likely to arrive at, according to present momentary vector of movement of the moving object, for example vector 104 of FIG. 2. For example, if object of interest being displayed in central display 402 moves upwards in central display 402, that is towards the upper side of FIG. 3, and this direction of movement corresponds, for example, to the direction North in the area being imaged, the area that will be displayed in display 406 will cover an area neighboring the area displayed in display 402 and north of it. Accordingly displays 404, 408 and 410 will display neighboring areas being West, East and South of the area displayed in central display 402. In a similar manner if one or more of encircling corners displays 452, 454, 456 and 458 are operative in control panel 400 the areas that will be displayed on each one of them may be North-West, North-East, South-East and South-West, respectively, of the area displayed in central display 402.

An imaged object may be presented in a 2D presentation mode, which means the object is presented on the background of a map, or a 2D picture or a 2D video image as taken from a video sensor so that the object is displayed above the position in that background which corresponds to the position of the imaged object in the real world. According to embodiments of the present invention an image may be presented, alternatively or additionally, in a 3D presentation mode. In the 3D presentation mode an imaged object may be presented on a 3D background which may display the terrain corresponding to the area displayed on the display and, optionally, may also comprise presentation of man-made objects, such as buildings, roads, power lines and the like. In the process of producing the 3D display information may be achieved from the 3D database available for surveillance system 10.

Figure 4:
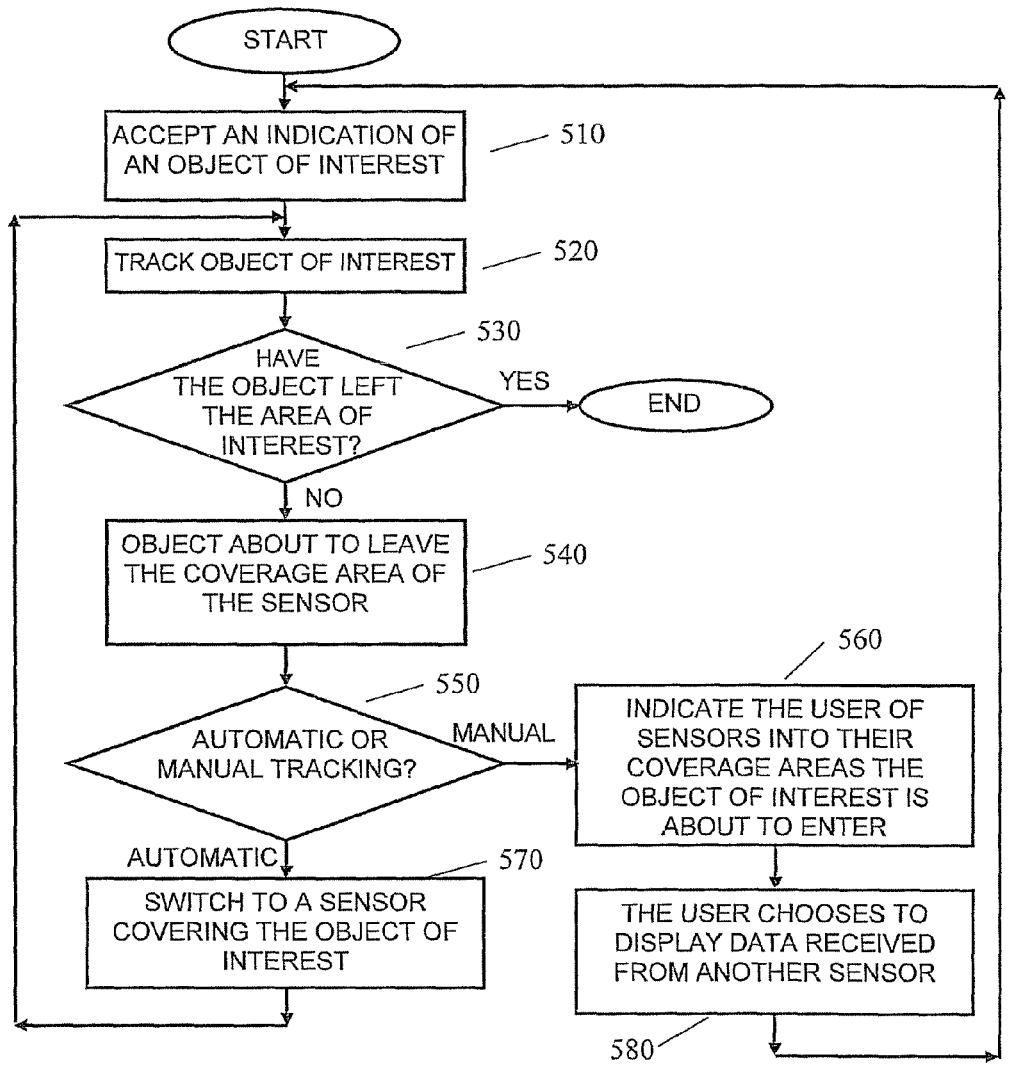
FIG. 4 is a schematic flowchart illustration of a method of tracking an object of interest by a surveillance system according to some embodiments of the invention.

Reference is now made to FIG. 4 which is a schematic flowchart illustration of a method which may be performed to track objects of interest by surveillance systems according to some demonstrative embodiments of the invention. The method may be performed by embodiments of the invention, for example, an embodiment as described with reference to FIG. 1 and is explained in details herein below.

Manual Tracking:

An object to be tracked may be initially identified when presented on any one of displays 402, 404, 406, 408 and 410 and, when applicable, on displays 452, 454, 456 and 458. Once that object has been selected by a user of surveillance system 10 for tracking as indicated in block 510 of FIG. 4. For example, as described above in details, surveillance system 10 may track the selected object, as indicated in block 520 of FIG. 4. While tracking the object, the sensor sensing that object will be assigned for display on central display 402. For example, if object 30 of FIG. 1 is to be tracked, a user may select its image appearing on, for example, encircling display 404 as an input from camera 18. As part of the response of surveillance system 10 to the selection of object 30 for tracking, the image received from camera 18 may be assigned for displaying on central display 402. Accordingly, surveillance system 10 may assign for display on one or more of encircling displays 404, 406, 408 and 410 visual inputs presenting of areas neighboring to the area presented.

Further, using inputs from one or more sensors having the tracked object within their sensing range, surveillance system 10 may calculate and optionally display, the geographical present position of the tracked object (in two or three dimensions as the case may be) and the momentary vector of propagation of the object on the display screen. When, due to its movement, the tracked object moves away from its previous location in which it was lastly marked for selection for tracking, the operator of surveillance system 10 may mark it again, thus assisting the system to keep track of the object. This manual process of tracking and present position updating of the tracked object may repeat itself as many times as may be needed or until the object reaches location where it is about to get out of the sensing area of the sensor presently tracks it. As a result of the on-going manual tracking and update of the present position of the tracked object, surveillance system 10 may use the information of the location of the tracked body versus time to present a continuous track sign of the subject on the 3D or 2D representation screen. If the sensor sensing the tracked object is a movable sensor, surveillance system 10 may move that sensor within its coverage area to geographically aim this sensor, for example a gimbaled video PTZ camera, onto the object at all times. For example surveillance system 10 may locate the object substantially in the center of the field of view (FOV) of that PTZ camera and thus the image of the tracked object may be displayed substantially in the middle of the display associated with the tracking camera.

Surveillance system 10 may further identify, based on the momentary geographically calculated vector of movement of the object and on the sensor coverage mapping which was described above, the time and location of the tracked object at which the object may reach a point of crossing the outer border of a coverage area of the sensor presently covering the object, as indicated in block 540 of FIG. 4. Surveillance system 10 may further calculate continuously and dynamically which is, or are, the sensors into their coverage area the tracked object is about to, or is able to enter shortly. Based on these calculations one or more of the identified sensors may be presented to the user of surveillance system 10, as indicated in block 560 of FIG. 4. For example these sensors may be presented to the user by displaying an indication on one or more screens at a location corresponding to the location of that sensor and further also providing additional data about that sensor, such as its type, an indication of its coverage area, etc. Such data, as well as the momentary movement vector and other data presented to the user may be referred to as system data. The user may be able to indicate to surveillance system 10 which one, or more, of these sensors he or she wants to activate next, as indicated in block 580 of FIG. 4. This way a continuous following of a tracked object may be obtained, until the object leaves the area of interest, as indicated in block 530 of FIG. 4.

Figure 5:
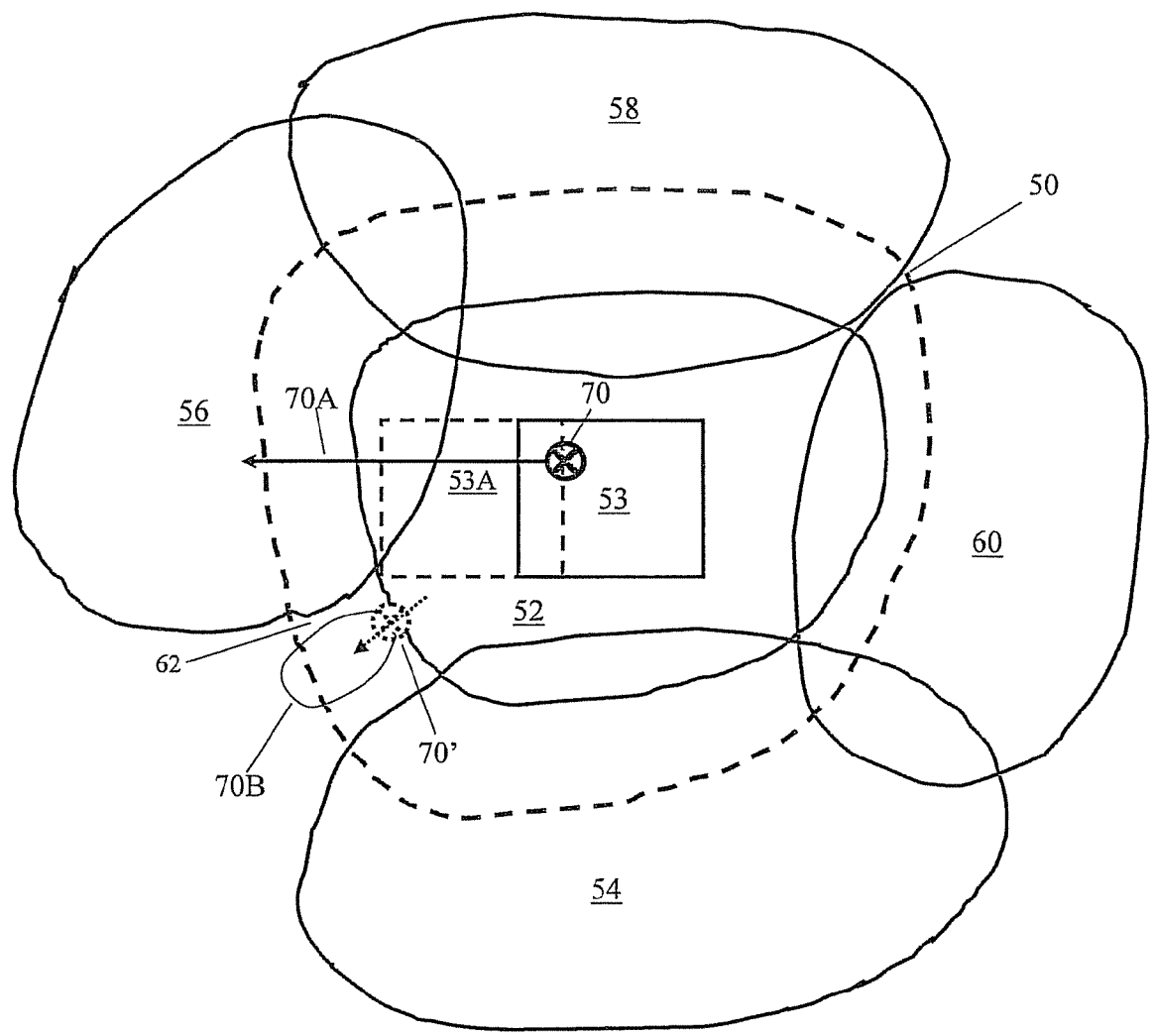
FIG. 5 is a schematic illustration of area coverage by sensors according to embodiments of the present invention.

Reference is made now to FIG. 5, which is a schematic illustration of area coverage by sensors such as sensors of system 10, according to embodiments of the present invention. As described above in details surveillance system 10 may present the information associated with areas surrounding the area which is currently presented on central display 402. When, for example, the input from sensor 16 (FIG. 1) is presented on display 402, the information associated with areas surrounding the area covered by sensor 16 may be received from, for example, sensors 14, 18 and 20 and the image data received from them may be displayed on displays surrounding display 402, such as display 404, 408 and possibly 452 and 454. As an additional example, when object 70 (FIG. 4) is tracked it may be sensed for example by sensor 18 of FIG. 1 and may be presented on central display 402. Sensor 18 may be, for example, a moveable PTZ video camera having a sensing area 52 and a momentary FOV 53. As long as object 70 moves within the coverage area 52 along movement vector 70A, for example, system 10 may display on screen 408 images from a sensor, such as sensor 16, presenting images of area on the right of object 70 as it moves. In a similar manner system 10 may present on screen 404 images of an area on the left of object 70, for example from sensor 20, etc. Additionally, as seen in FIG. 5, the momentary vector of propagation 70A of tracked object 70 points to the left of the page. Accordingly, at a certain later time when object 70 has moved to the left of the page the FOV of sensor 18 may propagate as depicted by FOV 53A. FOV 53A may reach the end of sensing area 52 of sensor 18 as object 70 continues to move along vector 70A. If at that time vector 70A remains pointing to the left surveillance system 10 may switch between sensor 18 having coverage area of sensing 52 to another sensor having coverage area of sensing 56, for example sensor 14 of FIG. 1, as its area of sensing covers an area left of coverage area 52. As long as object 70 is in the sensing range of sensor 18, which is in sensing area 52, the image of sensor 14 may be displayed on display 404. Accordingly, the sensor covering area 58 may be displayed on display 406, the sensor covering area 60 on display 408 and sensor covering area 54 on display 410. When object 70 moves out of sensing area 52 and enters, for example, sensing area 56 the image of the respective sensor, for example video camera 14, may be now presented on central display 402 and the image from the sensor of covering area 52, for example video camera 18, may be displayed on display 408. If, due to its movement, object 70 is about to enter an area which is not covered by any sensor inside area of interest 50, for example area 62, surveillance system 10 may still attempt to follow the object using, for example, dead reckoning (DR) calculations based on the last known data of movement of object 70. When tracking has switched to DR tracking mode, for example due to loss of continuous contact with the tracked object, for example as depicted by symbol 70' having a last known vector of propagation presented by the arrow in symbol 70', surveillance system 10 may provide next to symbol 70' an area 70B representing the area of uncertainty of the location of object 70. The shape, size and direction of area 70B, as well as its speed of movement, may be calculated based, for example, on the maximum speed of object 70 as known or evaluated, the maximum maneuvering capability of object 70, as known or evaluated, the time passed since object 70 last been sensed by surveillance system 10, and the like.

Corrected Automatic Tracking:

Alternatively or additionally the tracking function surveillance system 10 may use automatic tracking capabilities, such as a dedicated software, which may be capable of automatically tracking a selected (for example marked) object, as indicated in block 550 of FIG. 4. Once tracking function has been activated to a selected (e.g. marked) object the rest of the features of the corrected automatic mode of tracking may substantially be the same as described above with respect to manual tracking with the exception that a user update of the present position of the object may not be needed. In case the automatic tracking fails to track the object, for example in cases where the image of the tracked object is taken on a background producing a very low contrast value, the automatic tracking function may fail and the 'eye-contact' of the sensor with the tracked object may be disconnected. In such cases the operator of the system may regain eye-contact of the system with the tracked object by means of manually correcting or manually tracking the subject until automatic tracking can be resumed. The handling of a case where object 70 gets close to a border of a present coverage area and is about to cross it may be done substantially as described above with respect to the manual mode, with the necessary differences. For example, in the corrected automatic mode, the system may switch the display to engage a sensor covering the object automatically, as indicated in block 570 of FIG. 4. In addition to the described above, in the corrected automatic mode, the system can support automatic "hand shake" between two consecutive tracking sensors by directing a sensor covering a sensing area neighboring the presently active sensing area, for example a moveable sensor, into the coverage presently active sensing area. For example, if sensor 14 covers sensing area 56 and sensor 18 covers sensing area 52, being at present the active sensing area, surveillance system 10 may direct sensor 14 to point at the point in sensing area which is closest to the track of object 70 just prior to the reaching of the border line of sensing area 52. When object 70 will eventually enter area 56, sensor 14 will be at its best direction for continuously tracking object 70, seamlessly if the operational limitations of sensors 18 and 14 allow that. This directing to a future location in order to provide seamless tracking of an object, for example object 70, upon passing from one coverage area to a second coverage, area is called hand-shaking herein after.

The tracking system may further be adapted to display on an operator's screen the identification of camera or a sensor presently tracking an object and the identity and status of a sensor/camera which is about to soon begin tracking of the object, should the object maintain its present movement beyond certain period of time. Additionally, the tracking system may continuously record the inputs from active sensors, or alternatively from active sensors involved with the tracking operation, preferably one feed channel per each sensor where all of the recorded channels are time-stamped by a single clock, preferably a world/local clock. The time stamps may be a very helpful tool when debrief or assessment session is to take place, allowing replay of the scenery at the location of surveillance at later times.

Loss of Continuous Track

When a continuous tracking contact with a tracked body is lost, for example when the LOS of the sensor tracking the tracked body is interrupted, a dead reckoning function may be activated, to evaluate the possible location of the tracked body with time. Based on the lastly known vector of movement of the tracked body a calculation of its future location, with respect to its last known location may be carried out. The calculation may take into considerations the last known speed, last known direction, available paths of propagation (for example, corridors in a building, staircases, etc.) and the like. Based on these considerations system 10 may draw an "inflating balloon" on the monitor's screens the boundary of which may represent the location to which the tracked body could have reached during the time passed since the loss of contact. System 10 may further display on the screen of the user sensors having the 'balloon' within their coverage area, thus allowing the user of system 10 to easily select one or more of such sensors for presenting on one or more screens of system 10.

Re Tracing/Back Tracking

By performing the above described tracking methods on a pre-recorded video stream, surveillance system 10 can offer tracking of a subject which was previously video-taped (or its location was otherwise recorded with sync signal, to allow future synchronization with input of other sensor or sensors stream or streams) in forward motion or backwards motion replay. The system may take into account the 3D geographical position of the tracked object and the time lapse, or other synchronizing means, in order to calculate the consecutive sensor to be engaged to the tracked object and to be displayed for the continuation of the track.

It will be recognized by those skilled in the art that the system and method described hereabove for monitoring and tracking of a single object may be similarly implemented for monitoring and tracking of a plurality of objects.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A surveillance system for monitoring an area of interest, the system comprising:
   computing unit;
   means for memory connected to said computing unit;
   means for input connected to said computing unit to receive user instructions;
   means for displaying connected to said computing unit and to a plurality of sensors to display data received from at least one of said sensors and system data, said displaying means comprising:
   a central display; and
   at least one encircling display; and
   a database of three dimensional coordinates indicative of the coverage space of said sensors;
   wherein said displays are capable of displaying at least text and video;
   wherein said plurality of sensors are in active communication with said computing unit, the coverage area of at least one sensor within said area of interest is mapped in a process of mapping, and saved to said computing unit, said coverage area is the area said sensor is able to sense;

said mapping including data describing elements or entities that interfere with the line of sight of said sensor;

said computing unit to compute for at least one of said sensors, the three dimensional coordinates of a location of a sensed item within said coverage area, based on data indicative of the location of said sensed item from said at least one sensor;

said computing unit to accept an indication of an object of interest in a two dimensional image displayed on said means for displaying from a user, and calculate a set of three dimensional coordinates indicative of the location of said object in said area of interest;

said computing unit to designate at least one sensor to monitor and track said indicated object of interest;

said means for displaying to display on said central display said location of said object of interest; and said means for displaying to display on said encircling displays areas neighboring the area displayed by said central display.

2. The system of claim 1, further comprising:
a terrain database indicative of height of points within said area of interest.

3. The system of claim 1, wherein said mapping comprise:
geographical data of said sensing area;
data describing terrain elements that interfere with the line of sight of said sensor; and
data describing man-made entities that interfere with the line of sight of the said sensor.

4. The system of claim 1, wherein said mapping comprise:
considering specific characteristics of said sensor, said characteristics are selected from a list comprising sensor type, sensor location, sensor angle of sight, sensor zooming capabilities and sensor performance data.

5. The system of claim 1, wherein said object of interest is presented in a format selected from a list comprising:
presenting said object of interest on the background of a map;
presenting said object of interest on the background of a two dimensional picture;
presenting said object of interest on the background of a two dimensional video image;
presenting said object of interest on a three dimensional background displaying a terrain corresponding to the area chosen for display; and
presenting said object of interest on a three dimensional background displaying a terrain corresponding to the area chosen for display together with man-made objects located at the area chosen for display.

6. The system of claim 1, further adapted to record inputs from at least one of said sensors.

7. The system of claim 1, further adapted to provide identification of sensors having a selected location inside their coverage area.

8. The system of claim 7, wherein said at least one sensor designated is selected by a user.

9. The system of claim 1, further adapted to calculate a momentary vector of movement comprising values representing the origin point, the direction of movement and the velocity of movement in case said object of interest is moving.

10. The system of claim 9, wherein said momentary vector of movement is displayed by said means for displaying.

11. The system of claim 9, further adapted to calculate based on said momentary vector of movement and on said sensor coverage mapping, which are the sensors into their coverage areas said moving object of interest is about to enter.

12. The system of claim 11, wherein the area being displayed on at least one of said side displays presents an area said moving object of interest is most likely to arrive at, according to said momentary vector of movement of said moving object.

13. The system of claim 11, further adapted to present to a user identification of said sensors into their coverage areas said moving object of interest is about to enter.

14. The system of claim 11, further comprising:
at least one preference table indicating priority of sensors having specific location inside said area of interest, said sensors are from said plurality of sensors.

15. The system of claim 14, wherein said priority is set based on parameters selected from a list comprising the quality of the information received through said sensor, the accuracy of the information, the readiness of said sensor and the nature of the signal provided by said sensor.

16. The system of claim 14, further adapted to automatically switch the display on said central display to engage to a selected sensor of said sensors into their coverage areas said moving object of interest enters based on said momentary vector of movement and said automatic preference table.

17. The system of claim 16, further adapted to direct said selected sensor to point to the point in said selected sensor coverage area which is closest to the track of said moving object of interest prior to switching the display on said central display to said selected sensor.

18. The system of claim 14, further adapted to:
evaluate future possible location of said object of interest in case continuous tracking contact with said object of interest is lost, said evaluation is based on parameters selected from a list comprising: last known location, last known speed, last known direction and available paths of propagation;
present to a user the boundaries of an area to which said object of interest could have reached based on said evaluation; and
display to a user list of sensors having said area within their coverage area.

19. The system of claim 1, wherein said at least one sensor is selected from a list comprising sensors providing two dimensional location data and sensors providing three dimensional location data.

20. The system of claim 1, wherein said at least one sensor is selected from a list comprising camera, video camera, IR camera, EM radar, sonar, very shortwave sensor and MRI sensor.

21. A surveillance method for monitoring an area of interest, the method comprising:
mapping the coverage area of at least one sensor of a plurality of sensors within said area of interest to create a mapped representation of said area, said coverage area is the area said sensor is able to sense;
said mapped representation including data describing elements or entities that interfere with a line of sight of said sensor;
saving said mapped representation of said coverage area;
displaying data received from at least one of said plurality of sensors and system data on means for displaying comprising:
a central display; and
at least one encircling display;
wherein said displays are capable of displaying at least text and video;
maintaining a database of three dimensional coordinates indicative of the coverage space of said sensors;
computing, for at least one of said sensors, the three dimensional coordinates of a location of a sensed item within said coverage area, based on data indicative of the location of said sensed item from said at least one sensor;

accepting an indication of an object of interest in a two dimensional image displayed on said means for displaying from a user, and calculate a set of three dimensional coordinates indicative of the location of said object in said area of interest;

designating at least one sensor to monitor and track said indicated object of interest;

displaying on said central display said location of said object of interest; and displaying on said encircling displays areas neighboring the area displayed by said central display.

22. The method of claim 21, further comprising:
maintaining a terrain database indicative of heights of points within said area of interest.

23. The method of claim 21, wherein said mapping comprise:
geographical data of said sensing area;
data describing terrain elements that interfere with the line of sight of said sensor; and
data describing man-made entities that interfere with the line of sight of the said sensor.

24. The method of claim 21, wherein said mapping comprise:
considering specific characteristics of said sensor, said characteristics are selected from a list comprising sensor type, sensor location, sensor angle of sight, sensor zooming capabilities and sensor performance data.

25. The method of claim 21, wherein said object of interest is presented in a format selected from a list comprising:
presenting said object of interest on the background of a map;
presenting said object of interest on the background of a two dimensional picture;
presenting said object of interest on the background of a two dimensional video image;
presenting said object of interest on a three dimensional background displaying a terrain corresponding to the area chosen for display; and
presenting said object of interest on a three dimensional background displaying a terrain corresponding to the area chosen for display together with man-made objects located at the area chosen for display.

26. The method of claim 21, further comprising recording inputs from at least one of said sensors.

27. The method of claim 21, further comprising providing identification of sensors having a selected location inside their coverage space.

28. The method of claim 27, wherein said designation of at least one sensor to monitor and track said indicated object of interest is done according to a user selection.

29. The method of claim 21, further comprising calculating a momentary vector of movement comprising values representing the origin point, the direction of movement and the velocity of movement in case said object of interest is moving.

30. The method of claim 29, further comprising displaying said momentary vector of movement by said means for displaying.

31. The method of claim 29, further comprising calculating based on said momentary vector of movement and on said sensor coverage mapping, which are the sensors into their coverage areas said moving object of interest is about to enter.

32. The method of claim 31, further comprising displaying on at least one of said side displays an area said moving object of interest is most likely to arrive at, according to said momentary vector of movement of said moving object.

33. The method of claim 31, further comprising presenting to a user identification of said sensors into their coverage area said moving object of interest is about to enter.

34. The method of claim 31, further comprising:
maintaining at least one preference table indicating priority of sensors having specific location inside said area of interest, said sensors are from said plurality of sensors.

35. The method of claim 34, further comprising setting said priority based on parameters selected from a list comprising the quality of the information received through said sensor, the accuracy of the information, the readiness of said sensor and the nature of the signal provided by said sensor.

36. The method of claim 34, further comprising switching the display on said central display automatically to a selected sensor of said sensors into their coverage areas said moving object o interest enters based on said momentary vector of movement and said automatic preference table.

37. The method of claim 36, further comprising directing said selected sensor to point to the point in said selected sensor coverage area which is closest to the track of said moving object of interest prior to switching the display on said central display to said selected sensor.

38. The method of claim 34, further comprising:
evaluating future possible location of said object of interest in case continuous tracking contact with said object of interest is lost, said evaluation is based on parameters selected from a list comprising: last known location, last known speed, last known direction and available paths of propagation;
presenting to a user the boundaries of an area to which said object of interest could have reached based on said evaluation; and
displaying to a user list of sensors having said area within their coverage area.

39. The method of claim 21, wherein said at least one sensor is selected from a list comprising sensors providing two dimensional location data and sensors providing three dimensional location data.

40. The method of claim 21, wherein said at least one sensor is selected from a list comprising video camera, IR camera, EM radar, sonar, very shortwave sensor and MRI sensor.

41. A non-transitory machine-readable medium having stored thereon instructions that, if executed by a machine, cause the machine to perform a method comprising:
receiving from at least one sensor location information of at least one object;
receiving user instructions;
mapping the coverage area of said at least one sensor of a plurality of sensors within an area of interest to create a mapped representation of said area, said coverage area is the area said sensor is able to sense;
said mapped representation including data describing elements or entities that interfere with a line of sight of said sensor;
saving said mapped representation of said coverage area;
sending for display data received from at least one of said plurality of sensors and system data on means for displaying; maintaining a database of three dimensional coordinates indicative of the coverage space of said sensors;
computing, for at least one of said sensors, the three dimensional coordinates of a location of a sensed item within said coverage area, based on data indicative of the location of said sensed item for said at least one sensor;

accepting an indication of an object of interest in a two dimensional image displayed on said means for displaying from a user, and calculate a set of three dimensional coordinates indicative of the location of said object in said area of interest;

designating at least one sensor to monitor and track said indicated object of interest;

displaying on a central display said location of said object of interest; and displaying on encircling displays areas neighboring the area displayed by said central display.

* * * * *